Aug. 19, 1969  T. E. DIXON  3,462,122
MOTOR-OPERATED LOAD-HANDLING APPARATUS WITH
PRESSURE-SENSITIVE MEANS CONTROLLING
MOTOR ACCELERATION
Filed Aug 21, 1967
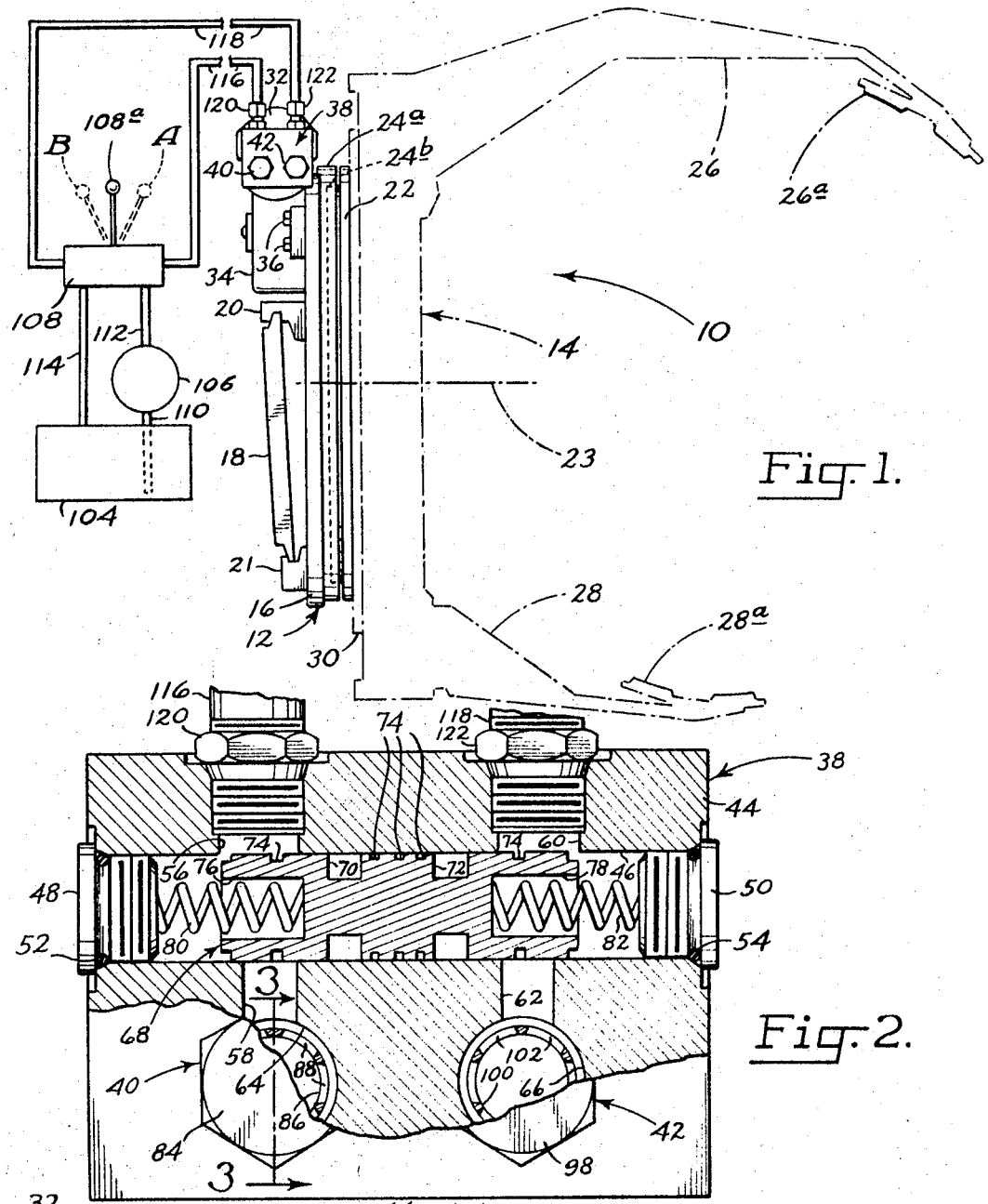
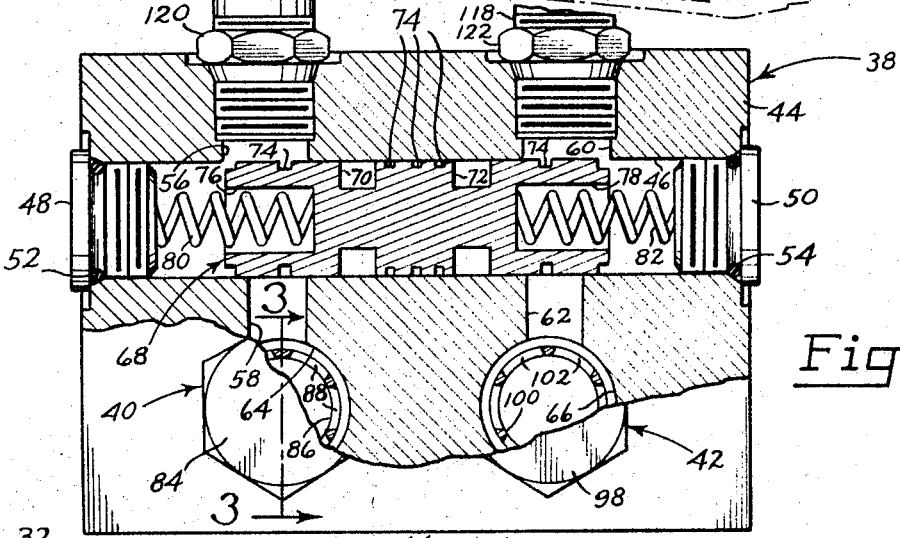
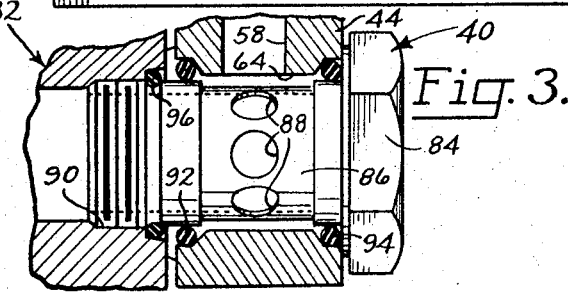
THOMAS E. DIXON
INVENTOR
BY Kolisch & Hartwell
Attys.

United States Patent Office 3,462,122
Patented Aug. 19, 1969

3,462,122
MOTOR-OPERATED LOAD-HANDLING APPARATUS WITH PRESSURE-SENSITIVE MEANS CONTROLLING MOTOR ACCELERATION
Thomas E. Dixon, Lake Grove, Oreg., assignor to Cascade Corporation, Portland, Oreg., a corporation of Oregon
Filed Aug. 21, 1967, Ser. No. 662,150
Int. Cl. F15b 11/04, 13/042
U.S. Cl. 253—1                                7 Claims

ABSTRACT OF THE DISCLOSURE

In load-handling equipment the combination of a movable load support, a fluid-operated motor for moving the support, and a device responsive to the pressure of fluid supplied to the motor to inhibit accelerated operation thereof due to the action of a load on the support through regulating the exhaust of fluid from the motor. The device includes a spring-biased movable piston against which fluid supplied to the motor acts to move the piston, and a valve closure part joined to and movable with the piston to open and close off a passage through which fluid exhausting from the motor flows.

---

This invention relates to fluid-power-operated load-handling apparatus, and more particularly to novel means in such apparatus for preventing a load that is handled from causing accelerated operation of a fluid-operated motor used in the apparatus. A preferred embodiment of the invention is described herein in connection with load-handling equipment adapted for attachment to an industrial lift truck, such equipment including a fluid-motor-operated rotator and a pair of load clamps mounted on the rotator.

In such load-handling equipment which employs a fluid-operated motor, a problem which sometimes develops during load handling is that the load through gravity pulls on the motor to cause it to run faster than it would by reason of pressure fluid supplied, so that the motor in effect becomes a pump. Such acceleration, if unchecked, makes accurate positioning of a load difficult, and can result in injury to personnel and in damage both to the load and to the load-handling equipment.

A general object of the present invention, therefore, is to provide, in load-handling apparatus including a fluid-operated motor, novel means for inhibiting accelerated operation of the motor due to the action of a load.

More particularly, an object of the invention is to provide such means which inhibits load-induced acceleration of the motor through responding to changing pressure conditions in fluid supplied to the motor resulting from such acceleration, and producing compensating changes in fluid flow through the motor.

Thus, the invention features a novel pressure-sensitive device that is responsive to changes in the pressure of fluid supplied to the motor to produce related changes in the rate of exhaust of fluid from the motor. The device includes a movable piston against which fluid supplied to the motor acts to move the piston, a fluid passage through which fluid exhausting from the motor flows, and a valve closure part operatively connected to and movable with the piston, which part functions to open and close off the fluid passage. On the motor tending to accelerate due to the action of a load, the pressure of fluid supplied to the motor drops, and results in the piston moving to shift the valve closure part to restrict the exhaust of fluid from the motor. Such a restriction of fluid exhausting from the motor tends to inhibit its acceleration.

Another object of the invention is to provide a pressure-sensitive device of the type indicated which operates automatically and rapidly to check load-induced motor acceleration.

A further object is to provide such a device which is simple in construction and reliable in operation, and easily installed for use with fluid motors in various types of load-handling apparatus.

Yet another object of the invention is to provide a load-handling apparatus combination featuring a reversible fluid-operated motor for running the apparatus which is controlled in either running direction.

These and other objects and advantages attained by the invention will become more fully apparent as the description which follows is read in conjunction with the accompanying drawings, wherein:

FIG. 1 is a simplified side elevaton illustrating load-handling apparatus adapted for mounting on an industrial lift truck, with such apparatus including a fluid-motor-operated rotator rotatably supporting a pair of load clamps, and employing a pressure-sensitive device as contemplated herein to control fluid flow through the motor that operates the rotator;

FIG. 2 is a view on a larger scale than FIG. 1 illustrating details of the pressure-sensitive device employed in the apparatus of FIG. 1; and FIG. 3 is a fragmentary cross-sectional view, on yet a larger scale than FIG. 2, taken along the line 3—3 in FIG. 2.

Turning now to the drawings, and referring first to FIG. 1, indicated generally at 10 is load-handling apparatus, including a rotator 12 and load-clamping mechanism, or load support means, 14, adapted to be mounted as an attachment on the front of an industrial lift truck. The rotator includes an upright flat base plate 16 which may be mounted on the usual elevatable carriage in a lift truck through a mounting plate 18, conventionally fastened to the carriage (not shown), and brackets 20, 21 secured to the back of plate 16. The rotator further includes an upright, flat, rotatable face plate 22 disposed in front of and substantially parallel with plate 16. Plate 22 is rotatably mounted on plate 16 through a conventional bearing assembly including an outer race partially shown at 24a fastened to the front of plate 16, and a relatively rotatable inner race partially shown at 24b secured to the back of plate 22. The axis of rotation of plate 22, shown at 23, extends in a direction normal to the planes of plates 16, 22.

Clamping mechanism 14 includes a pair of opposed relatively movable, power-operated clamping arms 26, 28 having clamping pads 26a, 28a, respectively, mounted on their forward extremities. The arms are mounted for movement toward and away from one another on a frame 30, and through this frame the mechanism is suitably anchored to the front face of plate 22 in the rotator. With movement of the arms toward one another, the clamping pads are adapted to clamp against opposite sides of a cylindrical load, such as a paper roll. For a more detailed description of a load-clamping mechanism similar to that shown herein, reference is made to a copending application of Donal M. Faust and Henry F. Chochrek, entitled "Clamping Mechanism," filed June 9, 1967, Ser. No. 645,027.

Plate 22 in the rotator and clamping mechanism 14 are rotated under power by means of a conventional, reversible, hydraulic motor, or motor means, 32 and a conventional drive unit 34 through which a suitable driving connection is established between the motor and plate 22. The motor is suitably mounted on the drive unit, and the drive unit, in turn, is mounted on the back side of plate 16 in the rotator by means of fasteners 36. Typically the motor drive unit may include a worm screw (not shown) driven by the motor and this worm screw drives a worm gear (not shown) mounted on plate 22.

Considering a situation which occurs during normal operation of the load-handling apparatus, with a load supported between clamping pads 26a, 28a, if the load is not positioned with its center of gravity located in vertical alignment with the axis about which the clamping mechanism rotates, an unbalanced condition exists. With rotation of the load with the rotator, the usual load at one time or another produces this unbalanced condition. With heavy loads and a high degree of unbalance, an undesired overriding situation results with the load tending to accelerate the motor beyond its normal running speed.

Thus, and according to the invention, means is provided herein for inhibiting accelerated movement resulting from such an unbalanced condition for a load. In a preferred embodiment, such means comprises a pressure-sensitive braking device or valve 38 mounted on motor 32 by means of fasteners 40, 42. As will be more fully explained, device 38 functions to regulate fluid flow through the motor in a manner which is responsive to the pressure of fluid supplied to operate the motor.

Considering FIGS. 2 and 3, device 38 includes a body 44. Extending completely through the body, from one side to the other thereof in FIG. 2, is an elongated bore 46 which is closed off at opposite ends by plugs 48, 50 screwed into the bore, and fluid seals 52, 54 sealing the outsides of the plugs to the inside of the bore. Communicating with bore 46 at points spaced along its length are pairs of substantially diametrically opposed bores, 56, 58 and 60, 62. Bores 56, 58 are spaced substantially the same distance from the left end of bore 56 in FIG. 2, as bores 60, 62, respectively, are spaced from the right end of bore 46. Bores 56, 60 open onto the top side of body 44. Communicating with the lower ends of bores 58, 62, which constitute fluid passages herein, and disposed at right angles to the axes of these bores, are bores 64, 66, respectively. Bores 64, 66 extend completely through body 44.

Slidably mounted in bore 46 is an elongated spool or cylindrical member 68. Extending about the outside of the spool, at the locations shown, are a pair of axially-spaced, annular channels 70, 72 which have relatively large cross-sectional areas. Channels 70, 72 are spaced substantially the same distance from the left and right ends, respectively, of spool 68. According to the invention, with shifting of the spool to the left in FIG. 2, channel 70 accommodates fluid flow between bores 56, 58 and with shifting of the spool to the right, channel 72 accommodates fluid flow between bores 60, 62.

Also extending about the outside of member 68 at points spaced along the length thereof are grooves 74, which have substantially smaller cross-sectional areas than the areas of channels 70, 72. These grooves function in a conventional manner to equalize the pressure acting on the outside of the spool whereby the spool tends to remain centered relative to the longitudinal axis of bore 46.

Extending axially into opposite ends of member 68 are bores 76, 78 which provide seats for the inner ends of springs, or biasing means, 80, 82. The outer ends of the springs are seated on plugs 48, 50, respectively. Such springs urge the spool to a centered position (the position shown) relative to opposite ends of bore 46.

Further describing member 68, the end surface area of the spool which faces plug 48 constitutes a pressure sensor, or piston portion, herein. Pressure fluid introduced into device 38 through bore 56 acts upon this surface area to urge the spool to the right in FIG. 2. That part of the spool which is disposed to the left of channel 70 in FIG. 2 and inwardly of its left end surface area constitutes a valve closure part or means herein which is adjustable, on shifting of the member, to change the degree of opening of bore 58. Bore 58 is never entirely closed off because of the presence of grooves 74 on member 68. However, the amount of fluid flow that can take place through the grooves is minimal.

Similarly, the end surface area of the spool which faces plug 50 constitutes a pressure sensor, or piston portion, upon which pressure fluid acts to urge the spool to the left in FIG. 2. Also, that part of the spool located to the right of channel 84 inwardly of the spool's right end surface area constitutes a valve closure part, which operates, on shifting of the member, to change the degree of opening of bore 62.

It will be noted that with member 68 in its centered position in bore 46, bores 56, 60 are open for communication with bore 46, whereas bores 58, 62 are substantially completely closed off.

Describing previously-mentioned fasteners 40, 42 through which device 38 is mounted on motor 32, these are substantially the same in construction. Considering fastener 40, and referring to FIG. 3, it includes a head part 84 disposed against the outside of body 44, and an integral, elongated, hollow cylindrical part 86 which extends inwardly from the head part through bore 64. The portion of part 86 which extends through bore 64 has a smaller outside diameter than the inside diameter of the bore, and is provided with plural, radially extending, circumferentially-distributed bores 88 communicating with the inside of part 86. The inner end of part 86 (the left end in FIG. 3) is threaded, and is screwed into a port 90 provided in motor 32. The fastener, in addition to mounting device 38 on the motor housing, provides for fluid communication between bore 58 and port 90, the latter constituting one of the two passages for supplying and exhausting fluid from motor 32.

Fluid seals 92, 94 provide a seal between the outside of part 86 of the fastener and the inside of bore 64, and a fluid seal 96 provides a seal between the outside of part 86 and the inside of port 90.

Similarly, fastener 42 includes a head part 98 and cylindrical part 100 which correspond to parts 84, 86, respectively, in fastener 40. Cylindrical part 100 extends through bore 66 in body 44, and includes bores 102 that correspond to bores 88. The inner end of part 100 is screwed into a port provided in the housing for motor 32 which is similar to port 90 and constitutes the other of the two passages for supplying and exhausting fluid from motor 32.

Referring again to FIG. 1, and completing a description of the apparatus shown therein, means for supplying pressure fluid through device 38 to motor 32 includes, a reservoir 104, a pump 106 and a main control valve 108. The reservoir and pump are also referred to herein as a source of pressure fluid. These may be conventional pieces of equipment mounted on the body of the usual lift truck. Pump 106 is connected to the reservoir by a conduit 110 and to rotator control valve 108 by a conduit 112. Valve 108 is connected directly to the reservoir by a conduit 114. Valve 108 is connected to device 38 by a pair of elongated conduits 116, 118, which are connected to bores 56, 60 through fittings 120, 122, respectively. Conduits 116, 118 and devices 38 constitute conduit means herein.

Rotator control valve 108 includes the usual handle 108a for adjusting the position of a valve spool in the valve. Handle 108a is shown in solid outline in the position which it occupies with the valve spool in a neutral position, where conduits 116, 118, are closed off by the valve, and conduits 112, 114 are permitted to communicate through the valve. Handle 108a may be moved to a positive A (shown in dashed outline) to adjust the valve spool to permit fluid to flow through the valve between conduits 112, 116 and between conduits 114, 118. Also, the handle may be moved to a position shown in dashed outline at B to adjust the valve spool to permit fluid flow to occur between conduits 112, 118 and between conduits 114, 116.

Explaining now how device 38 operates in the apparatus described, the valve handle of valve 108 is adjusted to position A to admit pressure fluid to conduit 116. Such fluid flows into bores 56, 46, and acts upon the left end surface area of spool 68 in FIG. 2 causing the spool to shift to the right against spring 82.

With sufficient shifting of member 68, bore 58 is opened for communication with bore 56 through bore 46, and bore 62 is opened for communication with bore 60 through channel 72. Upon opening of these bores, pressure fluid flows into the motor through bores 56, 46, 58, 64, 88 the hollow interior of part 86 in fastener 40, and port 90 in the motor housing. Fluid exhausts from the other port in the motor housing through the hollow interior of part 100 in fastener 42, bore 102, 66, 62, channel 72, bore 60 and conduit 118. This causes the motor to operate in one direction. With the motor thus operating, plate 22 in the rotator, clamping mechanism 14, and any load supported between clamping pads 26a, 28a rotates.

If an unbalanced conditon tending to produce overrunning exists, the motor acts as a pump and the pressure of fluid in bore 56 drops. When this occurs, the fluid-pressure-produced force urging spool 68 against spring 82 decreases, and the spool shifts back to the left in FIG. 2 under the action of the spring. Such return shifting of the spool, through shifting of channel 72, results in a related partial closing off of bore 62 and a corresponding in the rate of exhaust of fluid permitted from the motor. With the exhaust thus restricted, compensating fluid flow results through the motor which inhibits acceleration whereby motor speed tends to remain constant.

With the construction shown for device 38, and in the mode of operation presently being considered, it will be appreciated that pressure fluid supplied the motor through conduit 116 constantly acts against the left end of spool 68 in FIG. 2. Device 38 is continually responsive to changes in this pressure, and even small load-induced variations in such pressure result in compensating fluid flow through the motor. Further, it will be noted that device 38 operates completely automatically.

Device 38 functions in a similar manner with fluid supplied to operate motor 32 producing reverse running direction. In this case valve handle 108a is adjusted to position B, to admit pressure fluid to conduit 118, and such fluid acts upon the right end of member 68 in FIG. 2, causing the member to shift to the left against spring 80. In this mode of operation, fluid flow through the device is the reverse of that first described, and it is the positioning of channel 70 relative to bores 56, 58 which produces compensating fluid flow to take care of load-induced acceleration of the motor. Device 38 is thus bidirectional in nature.

Thus, the invention provides novel means for automatically sensing changes in the pressure of fluid supplied to a fluid-operated motor, and for producing related changes in the rate at which fluid is permitted to exhaust from the motor. With such means employed with a motor, and with the motor driving a load, any tendency of the load to accelerate the operation of the motor is counteracted by compensating fluid flow through the motor which inhibits acceleration.

While an embodiment of the invention has been described herein, it is appreciated that variations and modifications may be made without departing from the spirit of the invention.

It is claimed and desired to secure by Letters Patent:

1. In combination with load-handling apparatus including movable load support means, and reversible fluid-operated motor means operatively connected to said support means for moving the same,
   a source of pressure fluid,
   and conduit means operatively interconnecting said source and said motor means for supplying fluid to and exhausting it from the latter to operate the same,
   said conduit means comprising a main control valve adjustable selectively to effect operation of said motor means in either of two directions, and
   a bidirectional pressure-sensitive braking device disposed downstream from said main control valve responsive to pressure conditions in said motor means, operable automatically and with the motor means operating in either direction on such pressure conditions changing as a result of a load tending to accelerate the operation of the motor means, to produce compensating fluid flow in said conduit means inhibiting such accelerated operation.

2. The apparatus of claim 1, wherein, for each direction of operation of said motor means, said braking device includes an adjustable valve means controlling fluid exhausting from said motor means, and the above-mentioned compensating fluid flow produced in said conduit means results from adjustment of said valve means.

3. The apparatus of claim 2, wherein said device further includes, for each direction of operation of said motor means, a pressure sensor responsive to the pressure of fluid supplied to said motor means operatively connected to the adjustable valve means provided for the particular direction of operation of the motor means, and operable, in response to variations in such pressure, to produce related adjustments of said valve means.

4. The apparatus of claim 3, wherein the pressure sensor and valve means provided for a given direction of operation of said motor means are interconnected in such a manner that a pressure decrease sensed by the sensor results in an adjustment of the valve means producing a decrease in the rate of exhaust of fluid from said motor means.

5. The apparatus of claim 4, wherein, considering the pressure sensor and valve means provided for a given direction of operation of said motor means, said sensor comprises a movable piston portion upon which pressure fluid supplied to said motor means acts, and said valve means comprises a valve closure part joined to said piston portion shiftable in response to movement of said piston portion to control the fluid flow permited by the valve means.

6. The apparatus of claim 5, wherein said pressure-sensitive device further includes a body, and said piston portions and valve closure parts comprise a unitary member slidably mounted within said body for movement in response to the action of pressure fluid on said piston portions.

7. In combination with a load-handling attachment including a rotator and a reversible fluid-operated motor for powering the rotator adapted to be mounted at one location on a lift truck, and supply means for supplying pressure fluid for operating said motor adapted to be mounted at another location on the truck, said supply means including a main control valve adjustable selectively to effect operation of the motor in either of two directions,
   a pair of elongated conduits operatively interposed between said main control valve and said motor for supplying fluid to and exhausting it from the motor, and
   a bidirectional pressure-sensitive braking valve mounted adjacent said motor and interposed between said motor and said conduits, said braking valve being responsive to pressure conditions in the motor, and operable automatically and with the motor operating in either direction on such pressure conditions changing as a result of a load on the rotator tending to accelerate the operation of the motor, to produce compensating fluid flow in said conduits inhibiting such accelerated operation.

References Cited

UNITED STATES PATENTS

| | | |
|---|---|---|
| 3,071,926 | 1/1963 | Olson et al. |
| 3,120,880 | 2/1964 | Jaseph. |
| 3,126,706 | 3/1964 | Dettinger. |
| 3,145,734 | 8/1964 | Lee et al. |
| 3,200,845 | 8/1965 | Nakazima et al. |
| 3,302,922 | 2/1967 | Gregor et al. _____ 253—1 |
| 3,330,531 | 7/1967 | Slator et al. _____ 253—1 |

EVERETT A. POWELL, JR., Primary Examiner

U.S. Cl. X.R.

137—624.27